United States Patent [19]

Hendrix et al.

[11] Patent Number: 5,573,210
[45] Date of Patent: Nov. 12, 1996

[54] PIPE HANGER AND METHOD

[75] Inventors: Randall R. Hendrix, 1422 Mundy's Mill Rd., Jonesboro, Ga. 30236; William H. Tittle, Hampton, Ga.

[73] Assignee: Randall R. Hendrix, Jonesboro, Ga.

[21] Appl. No.: 423,879

[22] Filed: Apr. 18, 1995

[51] Int. Cl.$^6$ ...................................................... F16L 3/00
[52] U.S. Cl. ............................................................ 248/59
[58] Field of Search ................................. 248/59, 58, 60, 248/61, 62, 63, 49, 65

[56] References Cited

U.S. PATENT DOCUMENTS

| | | | |
|---|---|---|---|
| 2,931,605 | 4/1960 | Kelly | 248/59 |
| 3,559,910 | 2/1971 | Babb | 248/59 |
| 5,221,064 | 6/1993 | Hodges | 248/59 |

*Primary Examiner*—Ramon O. Ramirez
*Attorney, Agent, or Firm*—Hopkins & Thomas; Scott A. Horstemeyer

[57] ABSTRACT

A pipe hanger (10, 110, 210) comprising hanger rail(s) (16, 116, 216) secured at one end to a floor joist (18) so as to depend downwardly from underneath the floor structure, a first bracket member (20a, 120a, 220a) having at least one longitudinal bore through which the hanger rail(s) is received and a notch (24, 124, 224) formed in one surface of the bracket member thereof. In communication with each longitudinal bore of the bracket member is a latching mechanism (26, 126, 226) which secures the bracket member to the hanger rail(s) such that the bracket member can freely move along the hanger rail(s) in one direction but is prevented from moving along the hanger rail(s) in the opposite direction without actuating a lever on either side of the bracket member. A second bracket member (20b, 120b, 220b) which is identical to the first, but rotated 180° so that its notched surface faces the notched surface of the first bracket member, can be slidably engaged with the hanger rail(s) so as to combined with the first bracket member to form a bracket mechanism. An alternative embodiment (310) comprises two notches (362, 363) on a diagonal for receiving and holding two separate pipes.

16 Claims, 6 Drawing Sheets

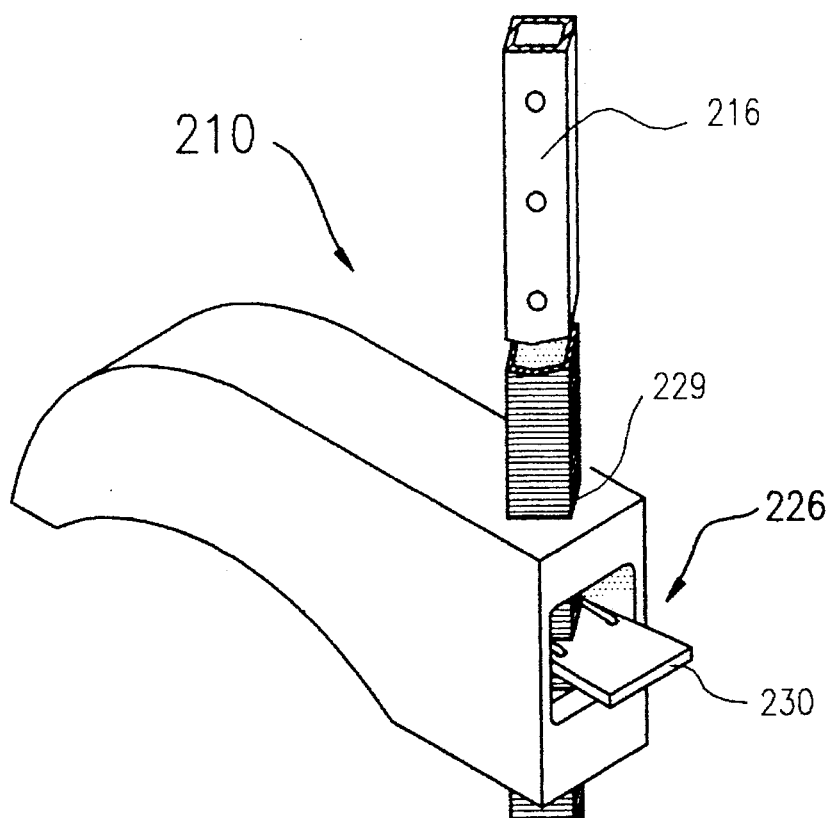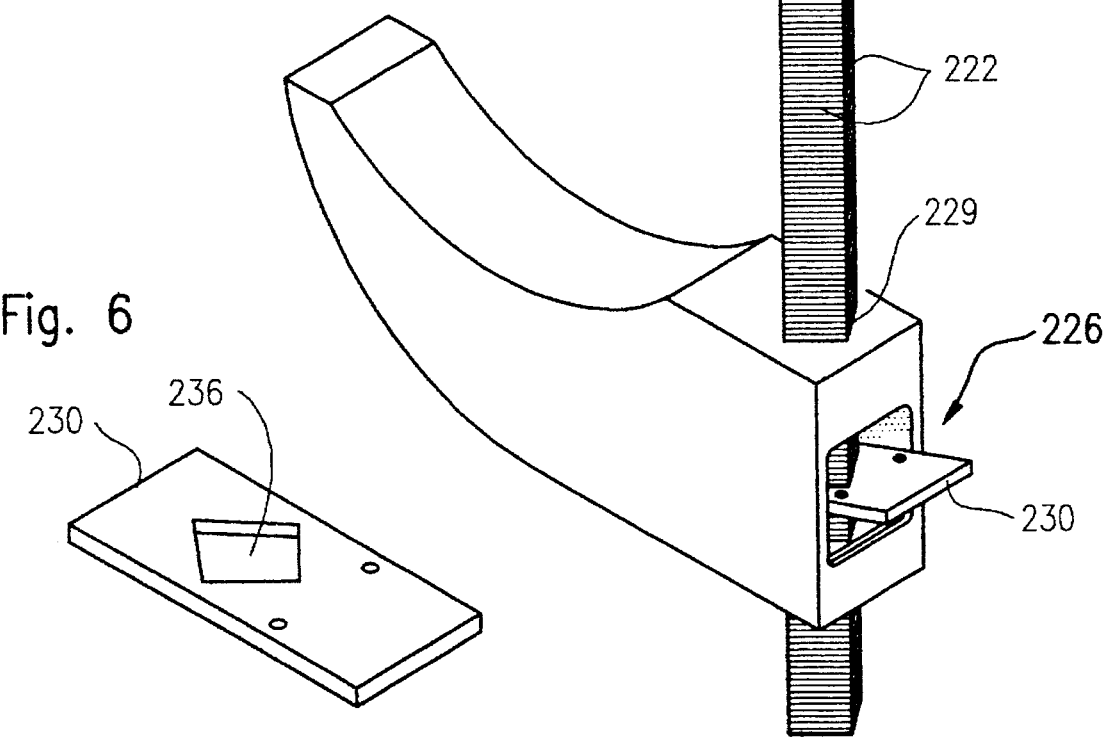

PIPE HANGER AND METHOD

FIELD OF THE INVENTION

The present invention generally relates to plumbing and pipe hangers, and more particularly, to a pipe hanger and method for efficiently hanging drain lines and supply lines from a floor structure in a residential or commercial building.

BACKGROUND OF THE INVENTION

An important part of a residential or commercial building's infrastructure is the plumbing system. The plumbing system is typically installed early on in the construction of a building regardless of whether it is a residential home or apartment building. Typically, a building is "dried-in" before the initial stages of the plumbing system are installed. This essentially means that the building is framed with a roof before the sewer and supply lines are installed so that the floor structure is in place when the plumbing installation begins. The initial stage of installing the plumbing system is referred to as the "rough-in" stage and comprises hanging both the sewer lines, also referred to as the drain lines, and the supply lines also referred to as the hot and cold water lines, from the floor structure of the building.

The most widely used method for hanging drain pipes from a floor structure includes nailing or screwing a two-by-four wood piece of a prescribed length to a floor joist of the floor structure so that the two-by-four wood piece extends downwardly from the floor structure. The pipe to be hung is then placed flush with the bottom surface of the two-by-four wood piece so that banding iron can be secured around the pipe and fastened to either side of the two-by-four wood piece using nails or wood screws. The banding iron is typically widely available strapping metal, one inch in width, with pre-stamped holes of various diameters throughout its length. The banding iron is usually purchased in roles and cut on-site to the appropriate length. Of importance when installing a pipe in this manner is the length of the two-by-four wood piece. Because the earth's gravity is used to produce flow within the pipe, the pipe must have an elevational decline or gradient along its length. Typically, the gradient is approximately one-half inch for every four feet of pipe, or one-eight of a bubble when using a level. Consequently, the two-by-four wood pieces must be pre-measured and cut to a prescribed length so that the pipe is provided with the appropriate gradient as it extends from one end of the building to the other.

Furthermore, installing a pipe using the banding iron requires the pipes to be loosely banded in place at first, while all of the piping is put in place. This disposition allows the plumber to connect pipe segments so as to achieve the desired pipe length and to insert "T" sections along the pipe's length at appropriate positions to accommodate various household items such as toilets, sinks, dishwashers, or washing machines. Once all of the pipes have been put in place and the "T" sections inserted, the banding irons are tightened so as to secure the pipes in place. Thus, the aforementioned procedure is a time consuming and detailed process.

Another disadvantage of the banding iron method of hanging pipes is the inability to accommodate pipes running diagonal to the floor joist. In such circumstances, the plumber must insert wedges between the two-by-four wood pieces and floor joist so as to produce the appropriate angle in the two-by-four wood pieces, aligning the two-by-four wood pieces with the piping. In addition, the plumber usually has to scavenge around the construction site for the two-by-four wood pieces used to hang the pipe. Once enough two-by-four wood pieces are found, the plumber must cut the two-by-four wood pieces to a specific length and split several two-by-four wood pieces for wedges.

An alterative method for hanging pipes comprises the use of J-hooks. The J-hooks are made out of molded plastic formed in a shape of a "J." The hooks are made of one-half inch square plastic rod approximately twenty-four inches long with the hooked or looped end forming a semicircle of the appropriate diameter so that a pipe will snap into place. At the opposite end of the hook, a plurality of pre-formed holes are provided through which nails or wood screws may be used to secure the J-hook to a floor joist.

As opposed to measuring the two-by-four wood piece and cutting them to the appropriate length so as to provide a pipe gradient, a portion of the securing end of the J-hook is merely broken or cut off at the appropriate length to provide the desired gradient. While the J-hook may be installed in less time than the two-by-four wood piece and banding iron method, the J-hook is succeptable to breaking at both the looped end and at the securing end. This is a substantial shortcoming because the "rough-in" plumbing is installed in the early phases of construction and later installation of the air-conditioning ducts often results in the drain lines and supply lines being pushed or pulled out of the way to accommodate the air ducts, often resulting in broken J-hooks. In addition, the J-hooks are not adjustable to various size pipes and cannot be utilized to hang piping run diagonal to the floor joist.

Consequently, there exists a heretofore unaddressed need in the industry for a method to more efficiently hang pipes which is quick, easy, inexpensive, versatile and reliable.

SUMMARY OF THE INVENTION

An object of the present invention is to overcome the deficiencies and inadequacies of the prior art that are described above and as generally known in the industry.

Another object of the present invention is to provide pipe hangers which are quick and easy to install.

Another object of the present invention is to provide a pipe hanger which is versatile in use so as to accommodate pipes of different sizes and pipes running parallel, transverse, or diagonal to the joist of a floor structure.

Another object of the present invention is to provide a pipe hanger which is inexpensive to manufacture, which is durable in structure, and which is efficient as well as reliable in operation.

Briefly described, the present invention is a pipe hanger comprising two parallel hanger rails, each respectively secured at one end to a floor joist so as to depend downwardly in a parallel arrangement from the floor structure. Slidably engaging both hanger rails is a first bracket member having two longitudinal bores through which the hanger rails are received and a notch formed in the bottom surface thereof. In communication with each longitudinal bore of the bracket member is a latching mechanism which allows the bracket to freely slide down the hanger rails but prevents the bracket member from sliding up the hanger rails without actuating a lever associated with each latch mechanism, thereby allowing the bracket member to be secured along the hanger rails in discrete increments. A second bracket member which is identical to the first, but rotated about 180° so that the notched surface faces upward, is slidably engaged with both hanger rails so as to combine with the first bracket member and form a bracket mechanism. The second bracket member freely slides up the hanger rails but will not slide downward without actuating the latching mechanisms on either side of the bracket member.

A second embodiment of the present invention comprises a single hanging rail and two identical bracket members which only have one longitudinal bore for slidably engaging the hanger rail. As with the first embodiment, latching mechanisms are provided which allow the single rail bracket members to slide freely along the hanger rail in one direction yet prevent movement in other direction without actuating the levers associated with each latching mechanism. Accordingly, the single rail bracket members can be secured in discrete increments along the rail.

A third embodiment of the present invention is substantially similar to the second embodiment though the longitudinal bore is pivoted 45° so that the bracket member radially extends at 45° angle with respect to the floor joist to which the hanger rail is attached.

A fourth embodiment of the present invention utilizes a single hanger rail which is received in a centrally located longitudinal bore. Provided on opposite side of the longitudinal bore are two notches disposed on a diagonal for holding the supply lines, i.e., hot and cold running water lines, on different horizontal planes.

A novel method for hanging pipes in accordance with the present invention comprises the following steps: (a) securing a hanger rail at one end to a floor joist so that the hanger rail depends downwardly from the floor joist, (b) slidably engaging a first bracket member with the hanger rail by sliding the first bracket member vertically up the hanger rail, (c) slidably engaging a second bracket member with the hanger rail so that the notches of the first and second bracket members face one another, (d) providing a pipe between the first bracket member and the second bracket member, and (e) urging the first bracket member and the second bracket member together so as to clamp the pipe in the recessed notches of the bracket members.

Other objects, features, and advantages of the present invention will become apparent to one of skill in the art from the following description when considered in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

FIG. 5 is a perspective view of a third embodiment of a pipe hanger in accordance with the present invention;

FIG. 6 is a perspective view of the latching plate of the pipe hanger shown in FIG. 5.

DETAILED DESCRIPTION OF THE PREFERRED EMBODIMENT

Figure 1:
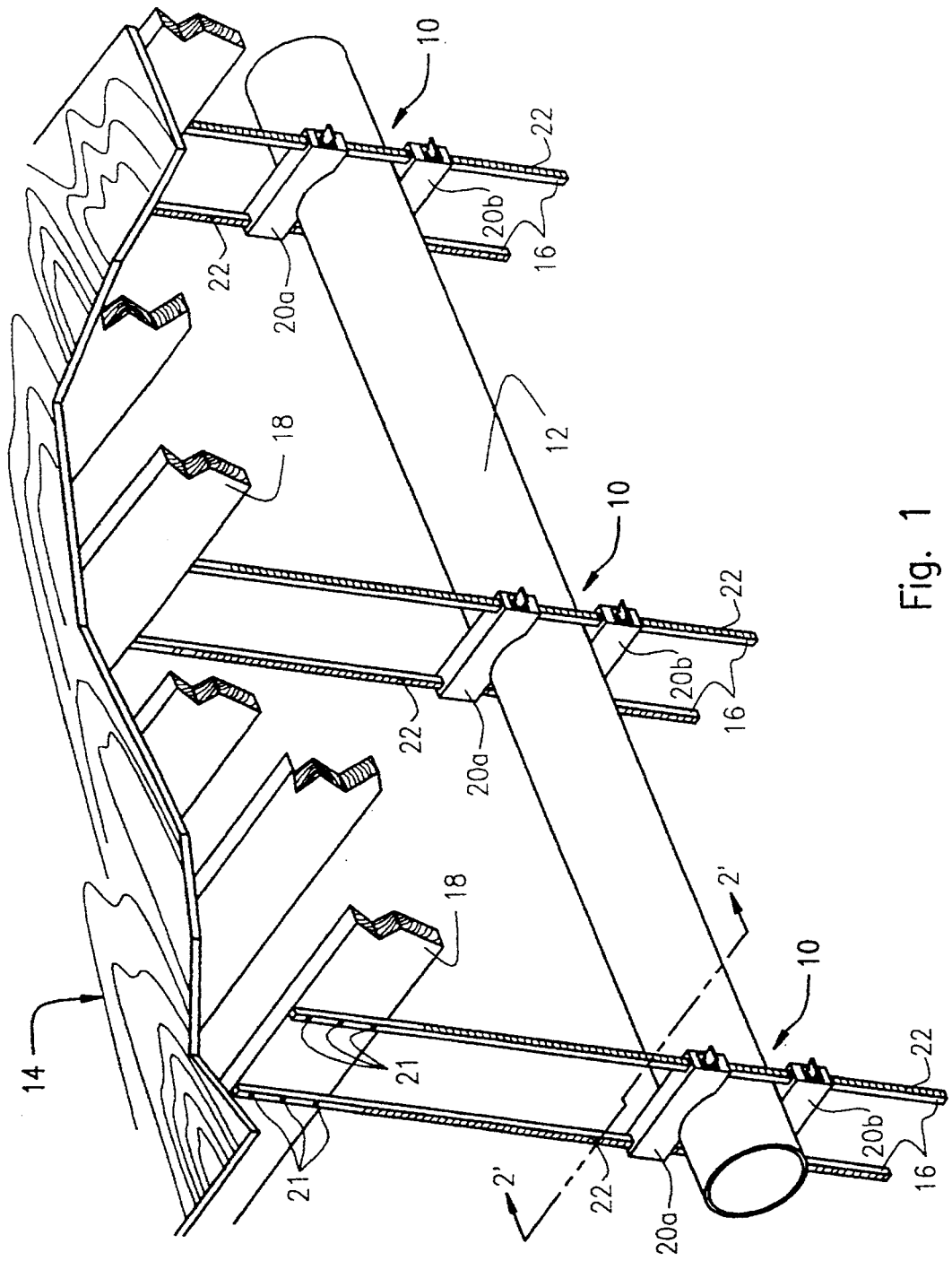
FIG. 1 is a perspective view of a pipe hung with pipe hangers in accordance with the present invention.

With reference to the drawings wherein like reference numerals represent corresponding parts throughout the several views, FIG. 1 illustrates a pipe hanger 10 in accordance with the present invention being used to hang drain pipe 12 underneath the floor structure 14 of a wooden framed building, such as but not limited to, a house or an apartment. Though the present invention is described herein as used with residential structures or apartment buildings having a basement or crawl space, it can be appreciated by those skilled in the art that pipe hangers in accordance with the present invention can be used in a variety of structures such as office buildings, hospitals, shopping centers or warehouses.

Figure 2:
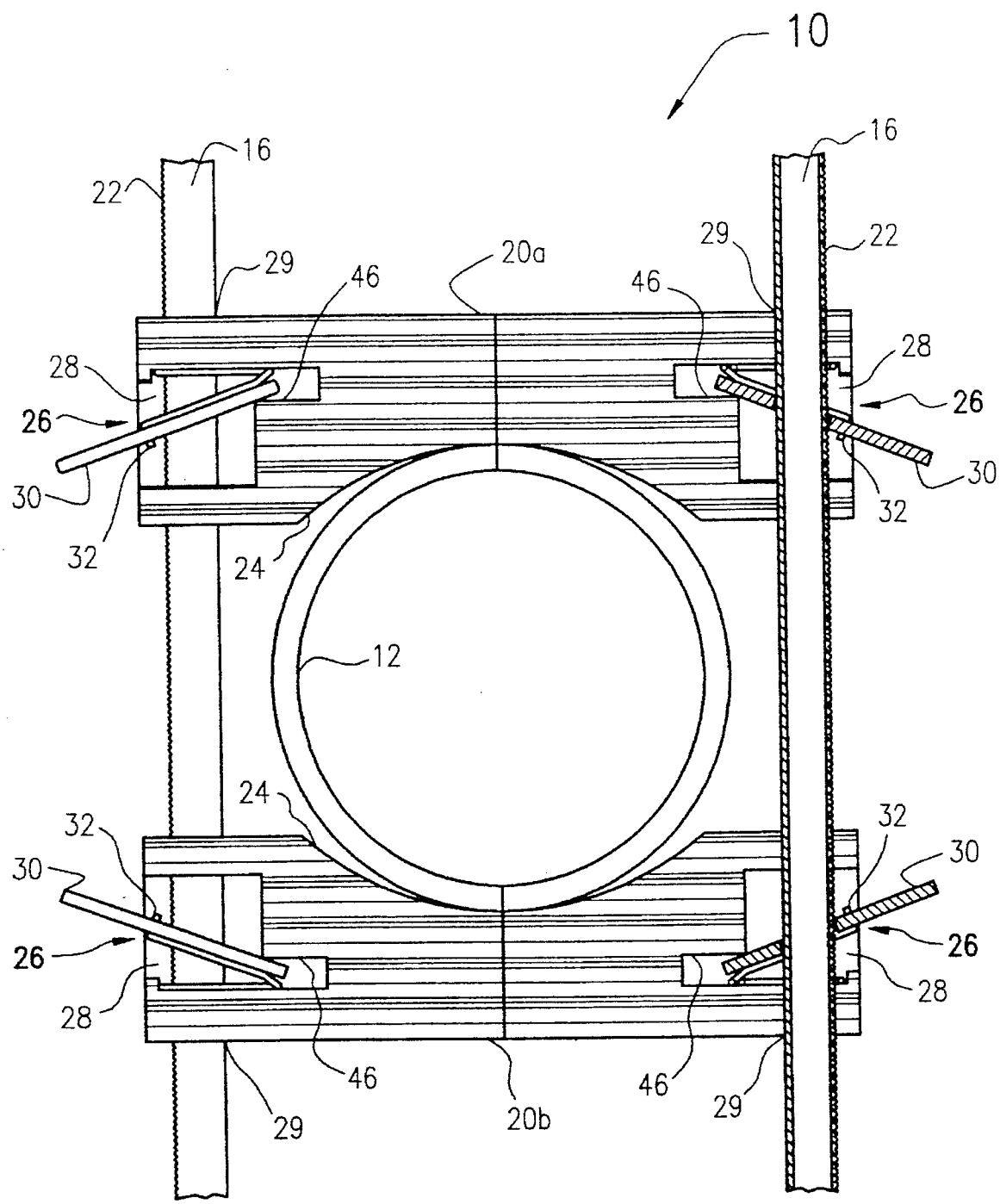
FIG. 2 is a staggered cross sectional view of the pipe hanger shown in FIG. 1 taken substantially along line 2'—2'.

Pipe hanger 10, as illustrated in FIGS. 1 and 2, is a double rail bracket design comprising two elongated hanger rails 16 which are respectively secured to and depending downwardly from a floor joist 18 in a parallel arrangement. Slidably engaging hanger rails 16 are bracket members 20a, 20b which rigidly hold drain pipe 12 in place. This configuration is particularly well suited for hanging drain pipes 12 which run substantially transverse to the direction of the floor joist 18.

Hanger rails 16 have three holes 21 disposed at one end for receiving securing nails or wood screws for securing the hanger rails 16 to floor joist 18. Hanger rails 16 are preferably made of steel but may also be made of other resilient material such as plastic or fiberglass. In the preferred embodiment, the hanger rails 16 are configured as tubular rods, one-half inch by one half inch square. The square, tubular design of hanger rails 16 provide substantial strength to pipe hanger 10, virtually eliminating any breakage during subsequent construction to the building. However, it can be appreciated that other hanger rail configurations are also suitable, for example, oval, rectangular, or L-bar.

On two adjacent surfaces of hanger rail 16 are indentations which form notch patterns 22 that expand substantially the full length of hanger rail 16. However, notch patterns 22 may extend over only a select portion of hanger rail 16 and may cover more or less than the two surface arrangement chosen for purposes of illustrating the preferred embodiment. The indentations are defined by 0.050 inch slits spaced 0.050 inches apart. The length of hanger rails 16 vary from about eighteen inches to about sixty inches, depending on the particular use as will be discussed in greater detail hereafter. Accordingly, the vertical design of the hanger rails permit them to be used on either side of bracket members 20a, 20b and to be secured to either side of floor joist 18, as illustrated in FIG. 1.

Illustrated in FIG. 2 is a staggered cross sectional view of the pipe hanger 10 shown in FIG. 1. Slidably engaging hanger rails 16 is a first bracket member 20a. Bracket member 20a is substantially rectangular in shape, preferably constructed out of plastic though other resilient materials, for example but not limited to, cast iron or steel, can likewise be used. In one surface of bracket member 20a is an arcuate notch or recess 24 designed and sized to receive pipe 12.

Disposed at either end of bracket member 20a are latch mechanisms 26. Each latch mechanism 26 is positioned within a cavity 28 integrated into either end of bracket member 20a. In addition, bracket member 20a includes two bores 29 which extend completely through bracket member 20a and are in communication with respective cavities 28. Operating in conjunction with bracket member 20a is bracket member 20b which form a bracket mechanism. Bracket member 20b is identical to bracket 20a, though it is rotated 180° and slidably engages hanger rails 16 in the opposite direction of bracket member 20a. Thus, bracket members 20a and 20b are configured to sandwich drain pipe 12, as shown in FIG. 2.

Latch mechanisms 26 enable bracket members 20a, 20b to freely slide along hanger rails 16 in one direction but prevent bracket members 20a, 20b from sliding in the opposite direction without actuating latching mechanisms 26. For example, as shown in FIGS. 1 and 2, bracket member 20a can freely slide downward along hanger rails 16. However, bracket member 20a will not move in a vertical direction along hanger rails 16 without simultaneously actuating latching mechanisms 26 by depressing levers 30. The converse is true in regard to the movement of bracket member 20b. That is, bracket member 20b can freely slide in the vertical direction along hanger rails 16, but latching mechanisms 26 must be simultaneously actuated by depressing levers 30 before bracket member 20b can be moved downward along hanger rail 16. Accordingly, because bracket member 20a resists upward movement without actuating levers 30 and bracket member 20b resists downward movement without actuating levers 30, when bracket members 20a, 20b are positioned about pipe 12 in the manner shown in FIG. 2, pipe 12 is firmly held in place.

Moreover, the interaction of latch mechanism 26 and notch patterns 22, as discussed in detail below, enables bracket members 20a, 20b to be secured at discrete increments along hanger rails 16 so as to provide pipe hanger 10 with extreme versatility in insulation and the capability of accommodating pipes of various sizes.

Figure 3A:
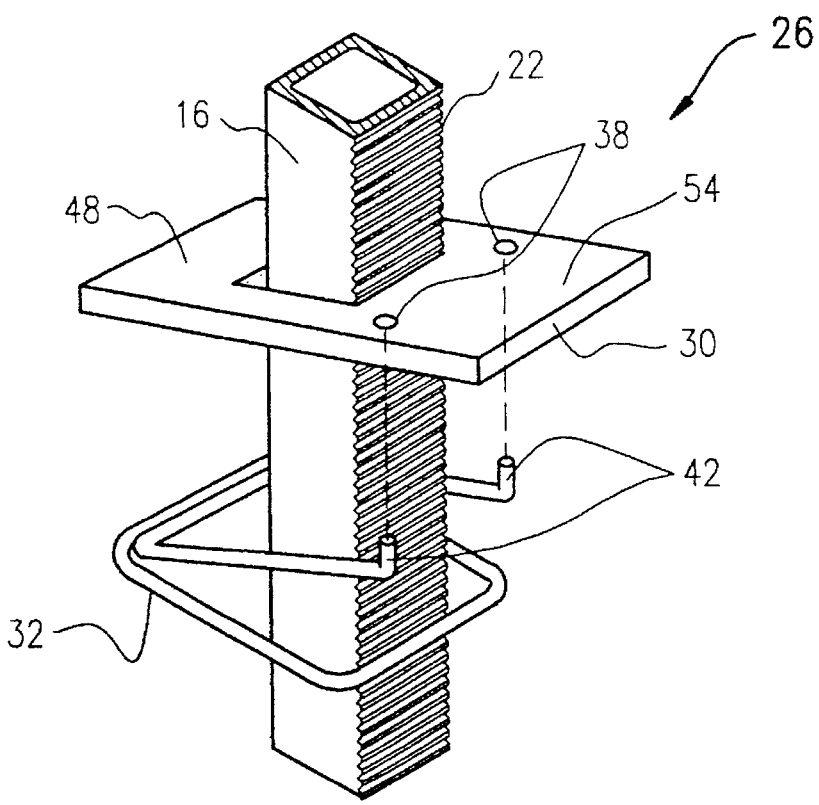
FIG. 3A is a partially exploded view of the latch mechanism of the pipe hanger shown in FIG. 1 configured about a hanger rail.
Figure 3B:
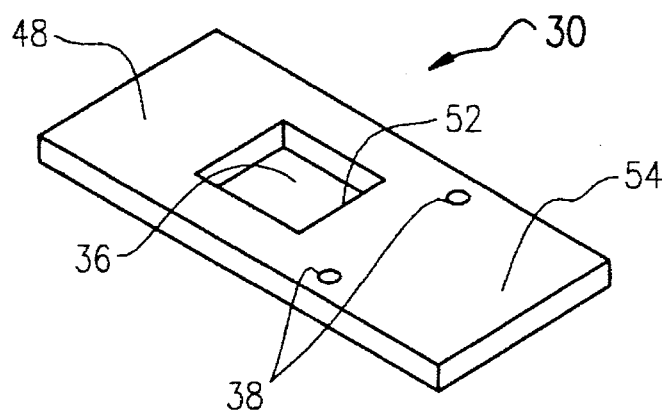
FIG. 3B is a perspective view of the latching plate of the latching mechanism shown in FIG. 3A.
Figure 3C:
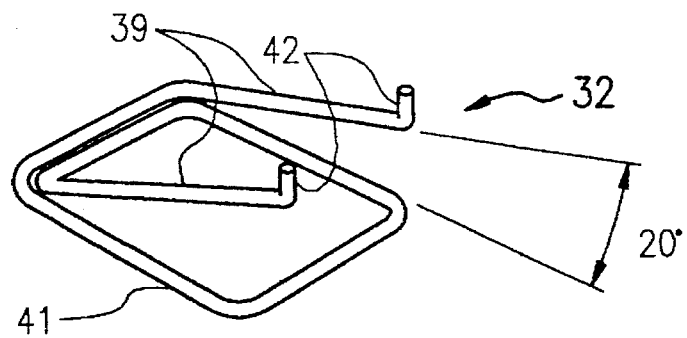
FIG. 3C is a perspective view of the latching spring of the latch mechanism shown in FIG. 3A.

Latch mechanism 26, as shown in relation to hanger rail 16 in FIG. 3A, comprises a lever 30 and spring 32. Lever 30, as illustrated in FIGS. 3A and 3B, includes an orifice 36 for receiving hanger rail 16 and two holes 38 for coupling lever 30 to spring 32. Spring 32, as shown in FIGS. 3A and 3C, is a typical steel spring having two angled arms 39 extending upwardly from a base 41 at an angle approximately $\Theta=20°$. At the distal end of arms 39 are fingers 42 which are received in holes 38 of lever 30, as indicated by the dashed lines in FIG. 3A.

Accordingly, as can be appreciated when viewing FIG. 2, when bracket member 20b is urged downward, ledge 46 of bracket member 20b presses downwardly against surface 48 (shown in FIGS. 3A and 3B) of lever 30. As a result, edge 52 (shown in FIG. 3B) of lever 30 is pivoted upward into hanger rail 16 and mates with the indentations of notch pattern 22 so as to prevent any downward movement of lever 30. Consequently, bracket member 20b can be selectively secured along hanger rail 16 at discrete increments along hanger rail 16 defined by notch pattern 22 so that, once secured, bracket member 20b is prevented from moving in a downward direction along hanger rail 16.

Latch mechanism 26 can be actuated by depressing surface 54 of lever 30 so as to disengage edge 52 from the indentations of notch pattern 22. Spring 32 keeps lever 30 at the appropriate angle $\Theta$ for maintaining a constant mating relationship between edge 52 and notch pattern 22 so that bracket 20b will not move in a relative downward motion without depressing surface 54 of lever 30. It can be appreciated by one skilled in the art that other latching mechanisms other than latching mechanism 26 as described herein would be suitable for operation with a pipe hanger in accordance with the present invention.

Figure 4:
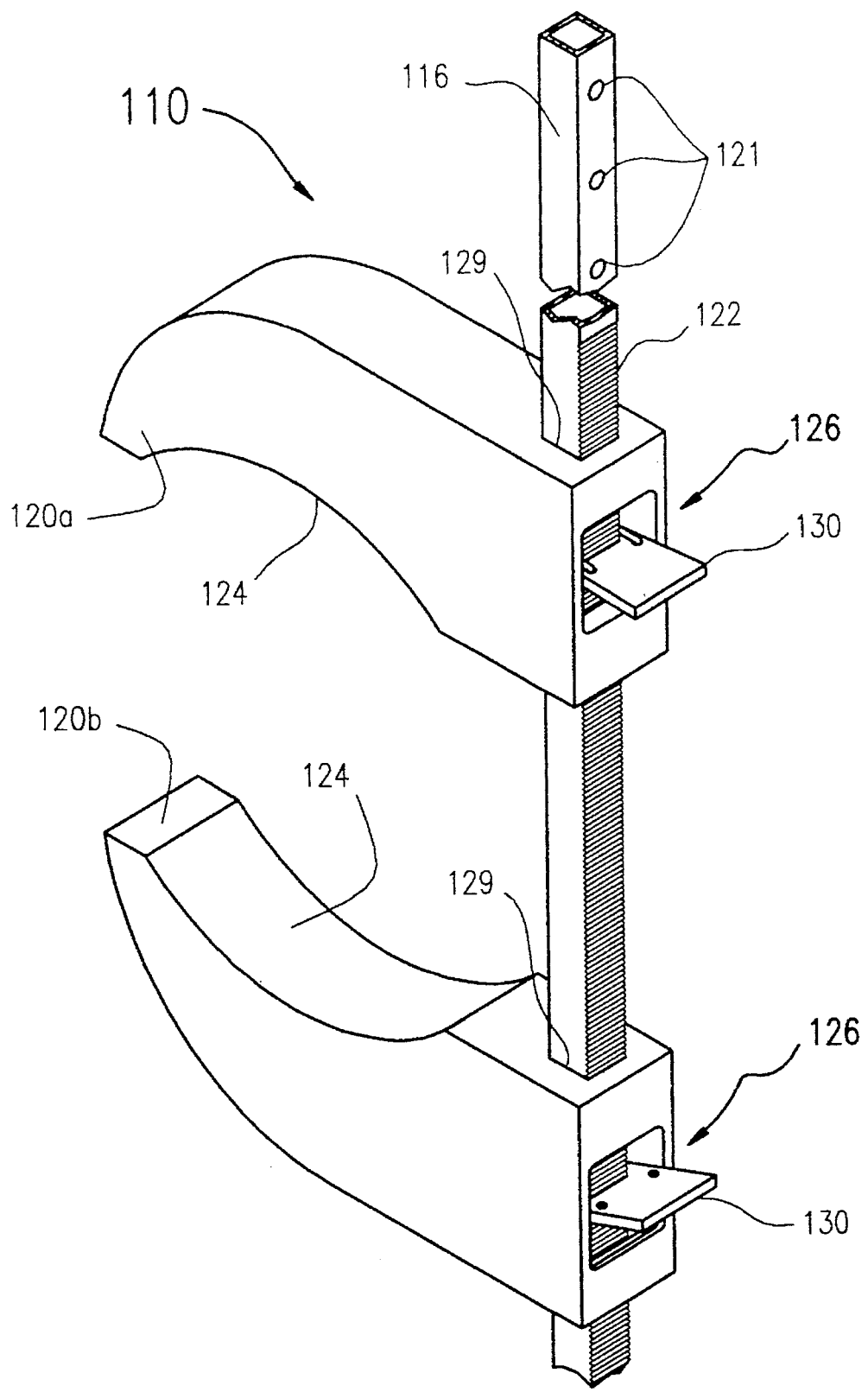
FIG. 4 is a perspective view of a second embodiment of a pipe hanger in accordance with the present invention.

A second embodiment of the present invention is a single rail pipe hanger 110, shown in FIG. 4. Pipe hanger 110 is particularly well suited for hanging a pipe running parallel with a floor joist as can be greater appreciated in light of the following description. Pipe hanger 110 comprises one rail hanger 116 having notch patterns 122 disposed on two adjacent surfaces as previously discussed. At one end of hanger rail 116 are three holes 121 through which nails or wood screws may be used to secure hanger rail 116 to a floor joist.

Bracket members 120a, 120b are substantially similar to bracket members 20a, 20b of the first embodiment, however, bracket members 120a, 120b are configured to operate with a single hanger rail 116 rather than two hanger rails. As with the first embodiment, arcuate notches or recesses 124 are provided in respective bracket members 120a, 120b for holding pipe 12.

Latch mechanisms 126 of respective bracket members 120a, 120b operate in substantially the same manner as latch mechanisms 26 of pipe hanger 10. Thus, bracket members 120a, 120b may be freely moved along hanger rail 116 towards one another without having to depress levers 130. However, to move bracket member 120a upward along hanger rail 116 or bracket member 120b downward along hanger rail 116, respective levers 130 of bracket members 120a or 120b must be actuated.

Because of the orientation of holes 121 on hanger rail 116, when hanger rail 116 is secured to a floor joist, bracket members 120a, 120b are perpendicular to the floor joist so that a pipe held in the arcuate notches 124 of respective bracket members 120a, 120b is aligned parallel to the floor joist.

A third embodiment of the present invention is another single rail pipe hanger 210, shown in FIG. 5. Pipe hanger 210 is substantially similar to single rail pipe hanger 110 except that bore 229 is rotated 45°. By incorporating a 45° off-set, pipe hanger 210 is particularly well suited for hanging pipes running at a diagonal to the floor joist. To accommodate the 45° off-set in bores 229, latching mechanisms 226 incorporates a lever 230 having an appropriately shaped orifice 236, shown in FIG. 6, configured to accommodate the off-set in hanger rail 216. In all other regards, latch mechanism 226 operates in the same manner as latch mechanism 26 of pipe hanger 10, as previously discussed.

Figure 7:
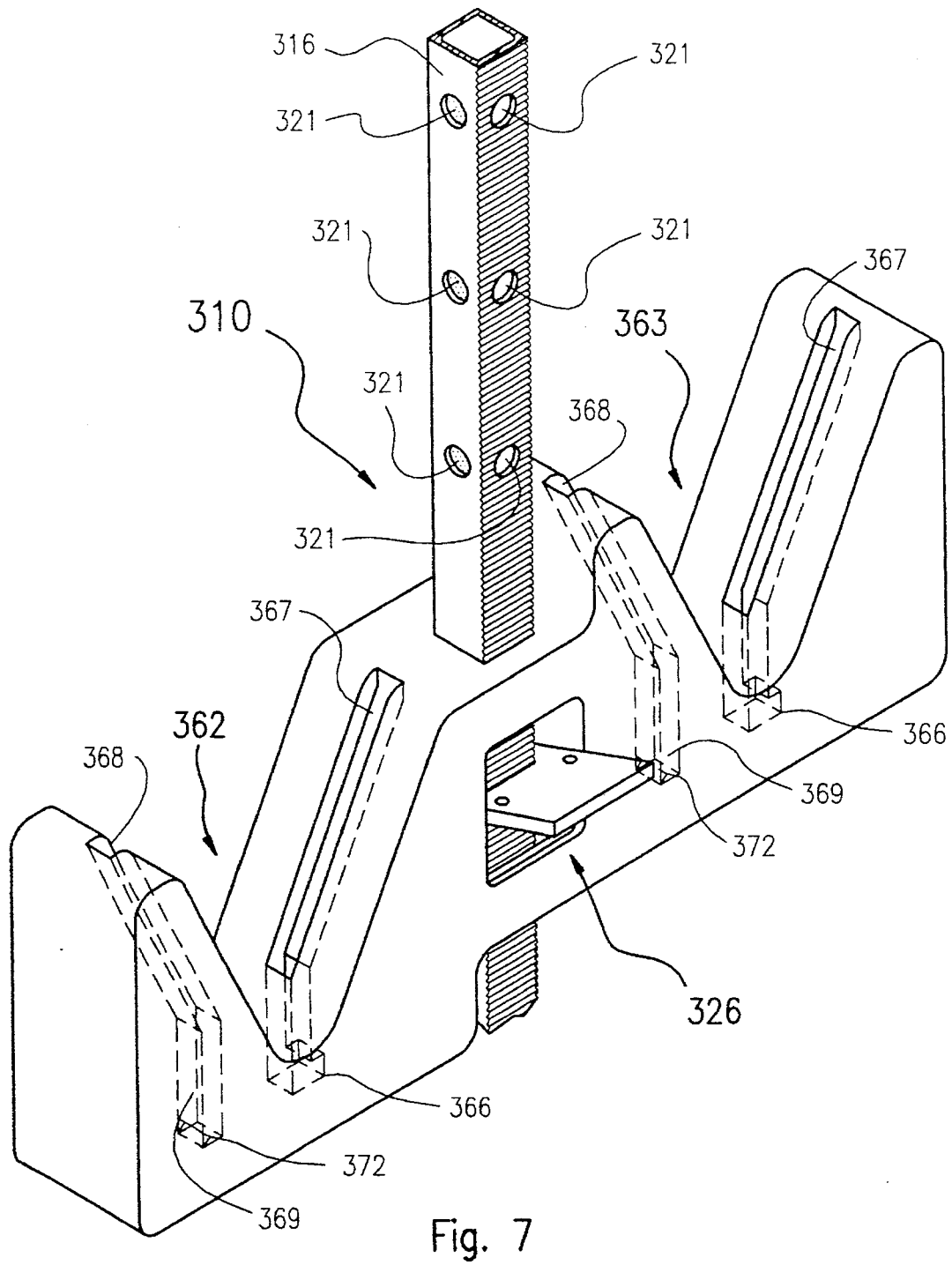
FIG. 7 is a perspective view of a fourth embodiment of a pipe hanger in accordance with the present invention.

A fourth embodiment of the present invention is a dual line single rail pipe hanger 310, shown in FIG. 7. Pipe hanger 310 is a single rail pipe hanger having two arcuate notches or recesses 362 and 363 configured to receive the hot and cold running water supply lines. The latching mechanism 326 of piper hanger 310 operates in the same manner as latching mechanisms 26, 126, and 226 of the previous embodiments of the present invention. Pipe hanger 310 is configured to operate with a single hanger rail 316 such that notches 362, 363 are disposed on opposite sides of hanger rail 316. Notches 362, 363 are horizontally off set so that a "T" section may be inserted anywhere along either the hot or cold supply lines without having to reposition the other supply line. The supply lines are held in notches 362, 363 by operation of tie straps which are first threaded up through bores 366 from the underneath side of pipe hanger 310, and up along channels 367 and around the pipes (not shown in FIG. 7) disposed in the respective notches 362, 363. The tie straps then pass along channels 368 and down through bore 369 where the tie straps are locked into place by rib 372. In addition, hanger rail 316 are preferably provided with holes 321 on all adjacent surfaces so that the pipe hanger can be utilized to hang supply lines running parallel or transverse to the floor joist.

Worth noting, at this point is the fact that pipe hanger 10, 110, 210 and 310 may be used in conjunction with one another to hang a single pipe which changes direction or to hang multiple pipes whereby multiple pipe hangers may be mounted to a single hanger rail.

A method for hanging a drain pipe with pipe hangers in accordance with the present invention comprises the following steps. First, it should be determined, based upon the alignment of the drain pipe with respect to floor joist, which pipe hanger would be appropriate for the installation. For example, a pipe running transverse with the floor joist might be best installed using pipe hanger 10 having double rail brackets. Alternatively, a drain pipe running parallel to the direction of the floor joist can be installed using single rail pipe hangers 110. For purposes of illustrating the present method, it will be presumed that the drain pipe is running transverse to the floor joist, as depicted in FIG. 1.

The next step is to size the hanger rails 16 so that the appropriate gradient is provided in the pipe. Because bracket members 20a, 20b are easily adjustable, this step requires little thought or effort in that the exact length of hanger rails 16 is not of critical importance. In the preferred embodiment, hanger rails 16 will be provided in approximately three different lengths: eighteen inches, twenty-four inches, and thirty-six inches. Because drain pipe 12 operates off gravity flow, drain pipe 12 must be hung at a decline, typically dropping one-half inches for every four feet of length. To accomplish this, an installer usually positions a pipe hanger every four feet along the length of drain pipe 12 using progressively longer hanger rails 16.

Once the appropriate hanger rail length is selected for each pipe hanger 10, the installer then secures the hanger rails 16 to floor joists 18. This is quickly accomplished by securing hanger rails 16 into place utilizing nails or wood screws in holes 21 of hanger rails 16. Preferably, the installer will secure one hanger rail 16 in place with one nail or wood screw in the uppermost hole 21. Then the installer will secure a second hanger rail 16 the appropriate distance from the first hanger rail 16, also only utilizing the top hole 21. Once the two hanger rails 16 are in place, bracket members 20a, 20b are slidably engaged to the first and second hanger mils 16 so as to assure hanger rails 16 are parallel. Thereafter, the installer may finish securing hanger rails 16 to joist 18 by inserting nails or wood screws into the remaining holes 21 of each hanger rail 16. This process is repeated for each pair of hanger rails 16 to be installed.

The installer then places drain pipe 12 into position in either one of two ways. First, the installer can open the space between bracket members 20a and 20b so that drain pipe 12 may be inserted between bracket members 20a and 20b of each pipe hanger 10. Alternatively, the installer may remove the bottom bracket member 20b from each pipe hanger 10 and successively place the pipe adjacent to upper bracket member 20a and then replace bracket member 20b and position it beneath drain pipe 12.

When all the pipe hangers 10 have been installed and the drain pipe 12 positioned between corresponding bracket members 20a and 20b, the installer may adjust the bracket members 20a, 20b up and down along hanger rails 16 so as to achieve the proper gradient in drain pipe 12 to facilitate gravity flow.

It will be obvious to those skilled in the art that many modifications and variations may be made to the preferred embodiment described above without departing from the novel teachings of the present invention. All such modifications and variations are intended to be incorporated herein and within the scope of the present invention, as set forth in the following claims.

We claim:

1. A pipe hanger for hanging a pipe from a floor structure, comprising:

an elongated hanger rail adapted to be mounted to the floor structure;

a said bracket member having a pipe support for supporting the pipe, and a latch securing said bracket member to said hanger rail, said latch being actionable to permit movement of said bracket member also on said rail and to permit securing of said bracket member at discrete increments along said hanger rail, wherein said latch allows said bracket member to freely slide in one direction along said hanger rail, and prevents said bracket member from moving in an opposite direction along said hanger rail unless said latch is actuated.

2. The pipe hanger of claim 1, herein said hanger rail includes transverse bores for receiving securing means for mounting said hanger rail to the floor structure.

3. The pipe hanger of claim 1, wherein said hanger rail comprises a notch pattern on at least one surface.

4. The pipe hanger of claim 1, wherein said hanger rail is tubular in construction.

5. The pipe hanger of claim 1, wherein said pipe support of said bracket member includes a recess in one surface of said bracket member for receiving the pipe.

6. A pipe hanger for hanging a pipe from a floor structure, comprising:

an elongated hanger rail adapted to be mounted to the floor structure;

a bracket member having a pipe support for supporting the pipe, and a latch securing said bracket member to said hanger rail, said latch being actionable to permit movement of said bracket member also on said rail and to permit securing of said bracket member at discrete increments along said hanger rail;

a second bracket member secured to said hanger rail and operating in conjunction with said bracket member to hold the pipe.

7. A pipe hanger for hanging a pipe from a floor structure, comprising:

an elongated hanger rail adapted to be mounted to the floor structure;

a bracket member having a pipe support for supporting the pipe, and a latch securing said bracket member to said hanger rail, said latch being actionable to permit movement of said bracket member also on said rail and to permit securing of said bracket member at discrete increments along said hanger rail;

said bracket member comprises a longitudinal bore configured to receive said hanger rail.

8. The pipe hanger of claim 7, wherein said floor structure comprises floor joists, and said bore of said bracket member is rotated a prescribed amount so that said pipe hanger is adapted to hanging pipes aligned at an angle to the joist of the floor structure.

9. A pipe hanger for hanging a pipe from a floor structure, comprising:

an elongated hanger rail adapted to be mounted to the floor structure;

a bracket member having a pipe support for supporting the pipe, and a latch securing said bracket member to said hanger rail, said latch being actionable to permit movement of said bracket member also on said rail and to permit securing of said bracket member at discrete increments along said hanger rail; and a second elongate hanger rail for mounting to the floor structure adjacent to said first hanger rail, and wherein said bracket member comprise two longitudinal bores, each said bone configured for receiving one said hanger rail.

10. A method for hanging a pipe from the floor structure of a building using pipe hangers comprising elongated hanger rails and bracket members having recesses for receiving the pipe, comprising the steps of:

securing a hanger rail to the floor structure;

attaching a racket member to said hanger rail for holding the pipe;

selectively moving said bracket member longitudinally along said hanger rail to desirable location and securing said bracket member to said hanger rail so as to produce said gradient over the length of pipe;

positioning said pipe in said recess in said bracket member; and securing another hanger rail from the floor structure and attaching said bracket member to said another hanger rail.

11. A pipe hanger for hanging a pipe from a floor structure, comprising:

an elongated hanger rail adapted to be mounted to the floor structure;

a bracket member having a pipe support for supporting the pipe, and a latch securing said bracket member to said hanger rail, said latch being actionable to permit movement of said bracket member also on said rail and to permit securing of said bracket member at discrete increments along said hanger rail; and a second pipe support, said pipe support and said another pipe support comprising respective first and second recesses in said bracket member which are horizontally offset, each said recess configured to receive one pipe.

12. The pipe hanger of claim 11, wherein said bracket member includes a centrally located longitudinal bore configured to receive said hanger rail, said first and second recesses disposed on opposite sides of said bore.

13. A pipe hanger for hanging a pipe from a floor structure of a building, comprising:

an elongated hanger rail having a first end and a second end, said hanger rail being adapted to be mounted to the underneath surface of the floor structure;

said first end of said hanger rail having transverse bores configured to receiving securing means for rigidly mounting said hanger rail to the floor structure so that said hanger rail depends downwardly from the floor structure;

a bracket member having a pipe support for supporting the pipe, a latch securing said bracket member to said hanger rail;

said hanger rail including a notch pattern disposed on at least one surface for interacting with said latch so that said bracket can be selectively moved along said hanger rail and can be secured at discrete increments along said hanger rail; and said bracket member radially extending from said hanger rail.

14. The pipe hanger of claim 13, wherein said bracket member can be moved in one direction along said hanger rail but is prevented from moving along said hanger rail in an opposite direction without actuating said latch.

15. A method for hanging a pipe from the floor structure of a building using pipe hangers comprising elongated hanger rails and bracket members having recesses for receiving the pipe, comprising the steps of:

securing a hanger rail to the floor structure;

attaching a racket member to said hanger rail for holding the pipe;

selectively moving said bracket member longitudinally along said hanger rail to desirable location and securing said bracket member to said hanger rail so as to produce said gradient over the length of pipe;

positioning said pipe in said recess in said bracket member; and attaching another bracket member to said hanger rail so that said bracket member holds the pipe and said another bracket member hold a second pipe.

16. A method for hanging a pipe from the floor structure of a building using pipe hangers comprising elongated hanger rails and bracket members having recesses for receiving the pipe, comprising the steps of:

securing a hanger rail to the floor structure;

attaching a racket member to said hanger rail for holding the pipe;

selectively moving said bracket member longitudinally along said hanger rail to desirable location and securing said bracket member to said hanger rail so as to produce said gradient over the length of pipe;

positioning said pipe in said recess in said bracket member; and attaching another bracket member to said hanger rail so that said bracket member and said another bracket member work together to hold the pipe in place.

* * * * *